Oct. 7, 1930.  V. A. TRIER  1,777,942

ELECTRIC SWITCH

Filed July 1, 1929

INVENTOR
V. A. TRIER
BY
Blair McIlvaine
ATTORNEYS

Patented Oct. 7, 1930

1,777,942

UNITED STATES PATENT OFFICE

VERNON ANTHONY TRIER, OF LONDON, ENGLAND

ELECTRIC SWITCH

Application filed July 1, 1929, Serial No. 375,213, and in Great Britain November 16, 1928.

This invention relates to switches for direction indicators of motor road vehicles of the kind which are "set" or closed by hand to illuminate a sign indicating a turn to the right or left, movement of the steering mechanism of the vehicle on the completion of the turn automatically returning the switch to its neutral or "off" position in which it is unaffected by movement of the steering mechanism.

The present invention has for its object the provision of an improved switch of the above general type which can be mounted on an existing steering column in a readily detachable manner.

According to this invention the switch is so constructed that when the lever is operated to close the indicator circuit it is simultaneously moved towards the steering wheel or other part of the steering mechanism which can then engage the lever and return it to its "off" or neutral position on the completion of the turn, the movement of the switch lever towards the wheel being effected by means of a cam or ramp which also forms one of the switch terminals.

The steering wheel or the end of the switch lever which cooperates with it carries a knob or trigger so attached by a yielding connection such as a spiral spring that when the wheel is turned from its "mid" or normal position towards a stop which limits the movement of the switch lever, the knob will yield without moving the lever. When, however, the wheel is rotated in the reverse direction, on the completion of the turn, the knob does not yield so that the switch is returned to its mid or "off" position where no engagement can take place between the wheel and the lever.

In order that the position of the lever and its yielding knob may be varied to suit various shapes and sizes of steering column and wheel, the lever is so mounted on the switch that the end thereof can be adjusted both axially and radially with respect to the axis of the switch and when so adjusted can be fixed in position as by set screws or the like.

Figure 1:
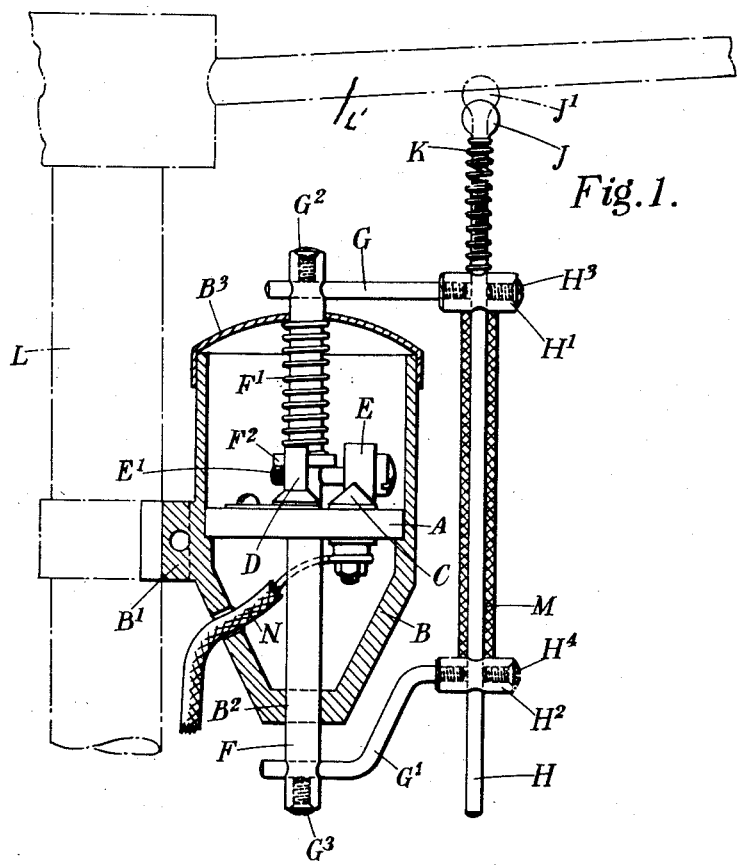
Figures 2, 3:
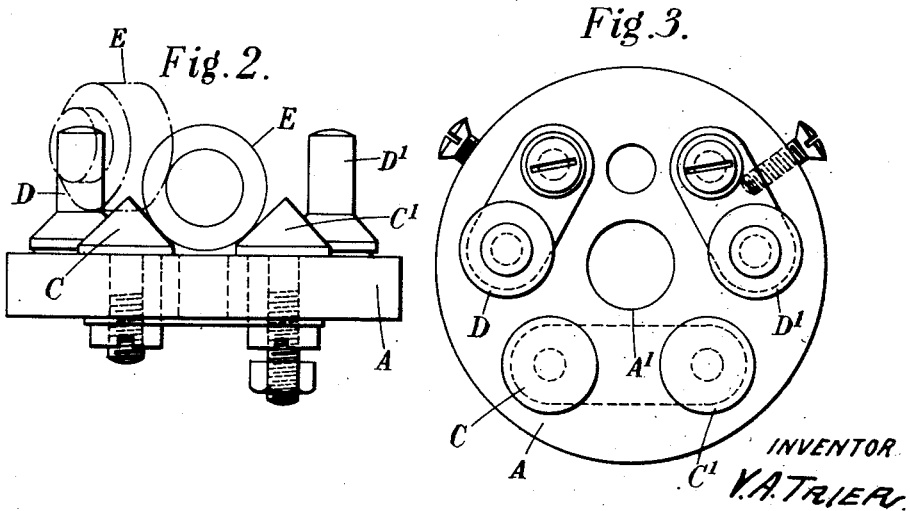

The following is a description of a preferred construction of switch according to the invention with reference to the accompanying drawings, in which Figure 1 is a sectional elevation of the switch, Figure 2 shows a side elevation of the contact supporting block and contacts, and Figure 3 is a plan view of Figure 2.

The switch comprises an insulated base A supported in a casing B provided with lugs $B^1$ by means of which it can be clamped to the steering column indicated in dotted lines at L in Figure 1. The insulated base A carries two inclined and preferably conical terminals C and $C^1$ (Figure 2) disposed between two conducting stops D and $D^1$, the stops and the terminals being arranged on the arc of a circle as is most clearly shown in Figure 3. Cooperating with the stops and terminals is a conducting roller E rotatably mounted on a pin $E^1$ itself fastened to a vertical spindle F supported in bearings $B^2$ and $A^1$ in the bottom of the casing B and the centre of the block A respectively. The roller E and the pin $E^1$ are so arranged that the curved surface of the roller will engage either one of the stops D, $D^1$ and one of the terminals C, $C^1$ or both the conical terminals.

The spindle F is connected by radial arms G and $G^1$ to the switch operating lever H which carries at its upper end a knob J attached thereto by a spring K so that the knob is resiliently mounted with respect to the lever H. The switch is so mounted on the steering column that in its "off" position the knob J is just below the spokes of the steering wheel as indicated by the dotted outline of a spoke $L^1$ in Figure 1. In order to simplify the drawing the steering column L is indicated in Figure 1 in a vertical position but it will be appreciated that in practice it is usually inclined to the vertical and that therefore the switch will also be inclined as it is clamped to the column so as to have its axis (spindle F) parallel to the axis of the column.

The spacing of the terminals C, $C^1$ and the stops D, $D^1$ and the diameter of the roller E are such that when the switch is moved into one of its "set" positions, i. e. with the roller engaging one of the stops and one of the conical terminals the roller is raised to the dotted position shown in Figure 2. The spindle F is thus lifted and carries with it the knob J which moves to a position shown in dotted lines at J¹ in Figure 1 such that it is in the path of the spoke L¹ of the steering wheel. The casing B of the switch is provided with a cover B³ and a compression spring F¹ is arranged between the cover B³ and a collar F² on the spindle F¹ which tends to force the spindle F and consequently the lever H in a downward direction.

The indicator circuits which are connected by the cable N to the stops and conical terminals by the corresponding nuts and bolts shown on the underside of the block A are so arranged that when the lever H is "set" the roller connects one conical terminal and one end stop to indicate a turn either to the right or to the left. When, however, the roller E connects the two conical terminals, the indicator is turned off.

The spring K is of a stiffness such that when the switch is in the "set" position with the roller E against the stop D or D¹, movement of the steering wheel in the direction of the indicated turn causes the knob J to be deflected by the spoke L, the roller E being against one of the stops D, D¹. When, however, the steering wheel is turned in the opposite direction, on the completion of the turn, the engagement of the spoke L¹ with the knob J causes the lever to be moved so that the spindle is rotated, the roller E moves to its central position between the two conical terminals C, C¹, and the knob J drops below the spoke L¹.

In order that the normal position of the knob J may be adjusted to suit various types of steering wheel, the radial arms G and G¹ are arranged to slide in holes in the spindle F and when adjusted are retained in position by set screws G², G³. The distance of the switch lever H from the spindle F can thus be adjusted. The lever H is conveniently attached to the arms G and G¹ by lugs H¹, H² through which it can slide to adjust the height of the knob J and is fixed in position in the lugs H¹, H² by set screws H³, H⁴. The lugs are maintained a constant distance apart by a sleeve M which surrounds the lever H.

It will be appreciated that constructional details may be modified without departing from this invention.

What I claim as my invention and desire to secure by Letters Patent is:—

1. In an electric switch the combination of two contacts one of cam-like form, a switch operating lever pivoted to turn over the contacts, a contact bridging member carried by the lever and adapted by cooperating with the cam-like contact to move the lever in the direction of its pivotal axis when it is turned about its pivot, and a resilient member attached to the end of the switch lever.

2. In an electric switch the combination of two contacts one of cam-like form, a switch operating lever pivoted to turn over the contacts, a contact bridging member carried by the lever and adapted by cooperating with the cam-like contact to move the lever in the direction of its pivotal axis when it is turned about its pivot, a resilient member attached to the end of the switch lever, and means for adjusting the end of the switch lever in both axial and radial directions.

3. In an electric switch the combination of four contacts, two of which are of cam-like form and are disposed between the other two, a switch operating lever pivoted to turn over the contacts, a contact bridging member carried by the lever and adapted to bridge two adjacent contacts and by cooperating with the cam-like contacts to move the lever in the direction of its pivotal axis when it is turned about its pivot, a resilient member attached to the end of the switch lever, and means for adjusting the end of the switch lever in both axial and radial directions.

4. In an electric switch for vehicle indicators having two "on" positions and an intermediate "off" position the combination with a pivoted switch lever of a conducting roller carried by the lever, four contacts so shaped and spaced that the roller bridges two adjacent contacts in each position of the switch and the roller together with the lever is displaced at right angles to the plane of the contacts when the switch is actuated from the "off" to either of the "on" positions and a resilient member attached to the end of the switch lever.

5. An electric switch comprising in combination an insulated switch base, four switch contacts on said base, two of which form conducting stops and the other two of which are of cam-like form and are disposed between the conducting stops, a switch operating lever pivoted to turn over the contacts, a contact bridging member carried by the lever and adapted by cooperating with the cam-like contacts to move the lever in the direction of its pivotal axis when it is turned about its pivot, a resilient member attached to the end of the switch lever, and means for adjusting the end of the switch lever in both axial and radial directions.

6. An electric switch comprising in combination a switch casing, means for clamping the casing to the steering column of a motor vehicle, an insulated switch base mounted in the casing, four switch contacts on said base, two of which form conducting stops and the other two of which are of cam-like form and are disposed between the conducting stops, a switch operating lever pivoted to turn over the contacts, a contact bridging member carried by the lever and adapted by cooperating with the cam-like contacts to move the lever in the direction of its pivotal axis when it is turned about its pivot, a resilient member attached to the end of the switch lever, and means for adjusting the end of the switch lever in both axial and radial directions.

In testimony whereof I have signed my name to this specification.

VERNON ANTHONY TRIER.